July 9, 1929.   F. P. ROBERTSON   1,720,379
VALVE CUT-OFF SAFETY APPARATUS
Filed April 21, 1927   3 Sheets-Sheet 2
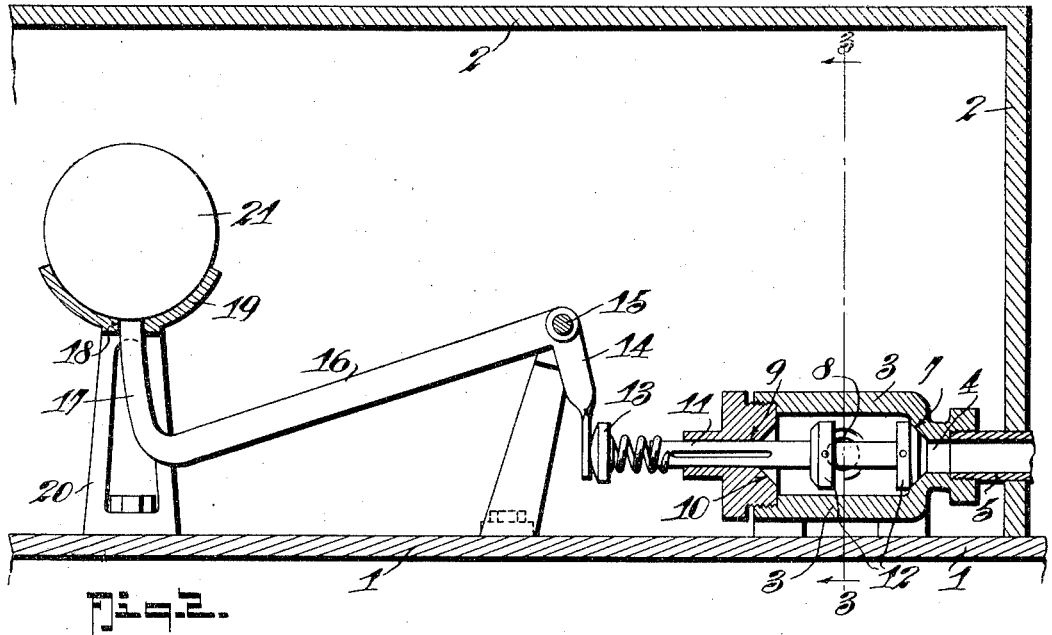
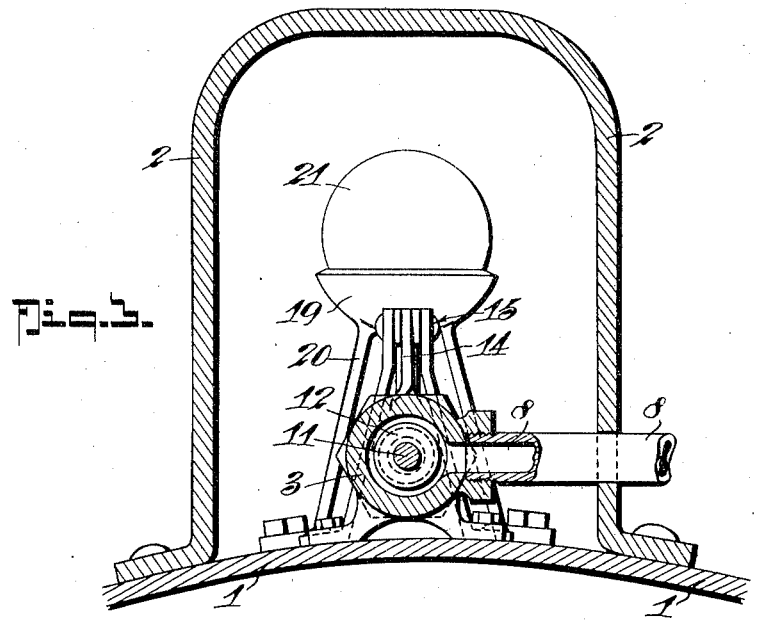
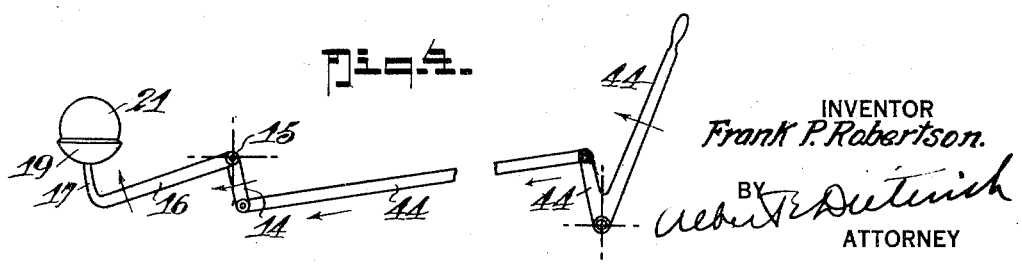
INVENTOR
Frank P. Robertson.
BY
ATTORNEY July 9, 1929.  F. P. ROBERTSON  1,720,379
VALVE CUT-OFF SAFETY APPARATUS
Filed April 21, 1927   3 Sheets-Sheet 3
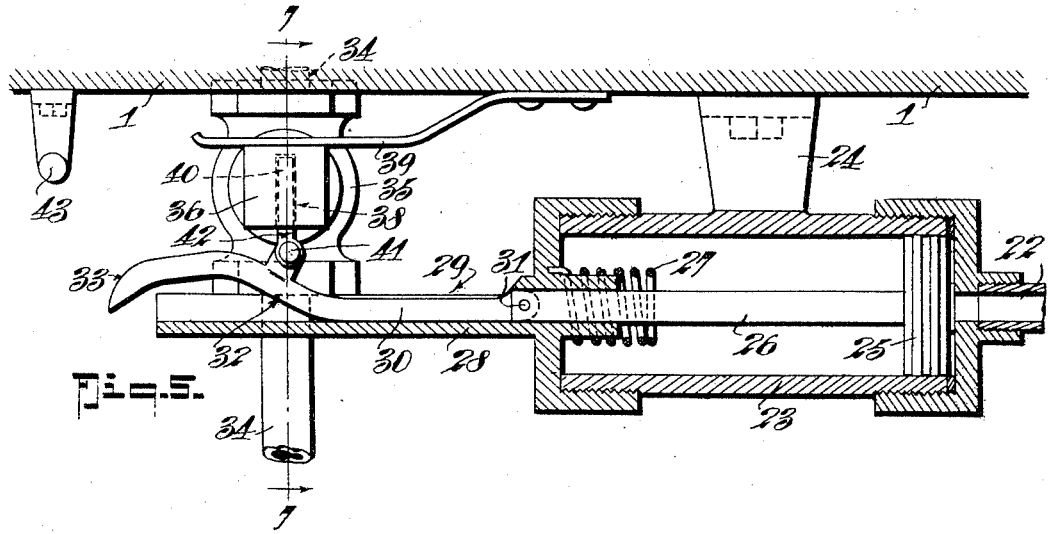
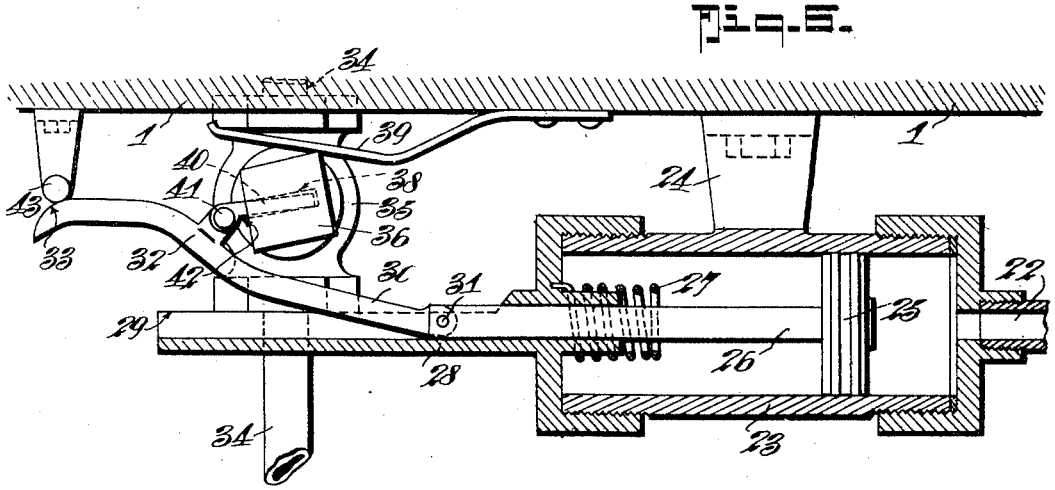
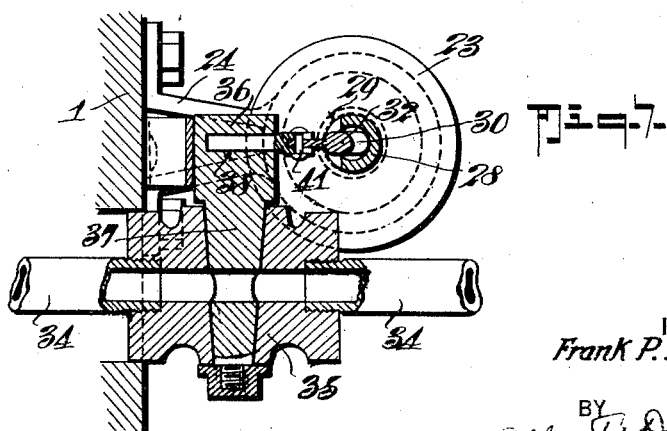
INVENTOR
Frank P. Robertson.
BY
ATTORNEY Patented July 9, 1929.

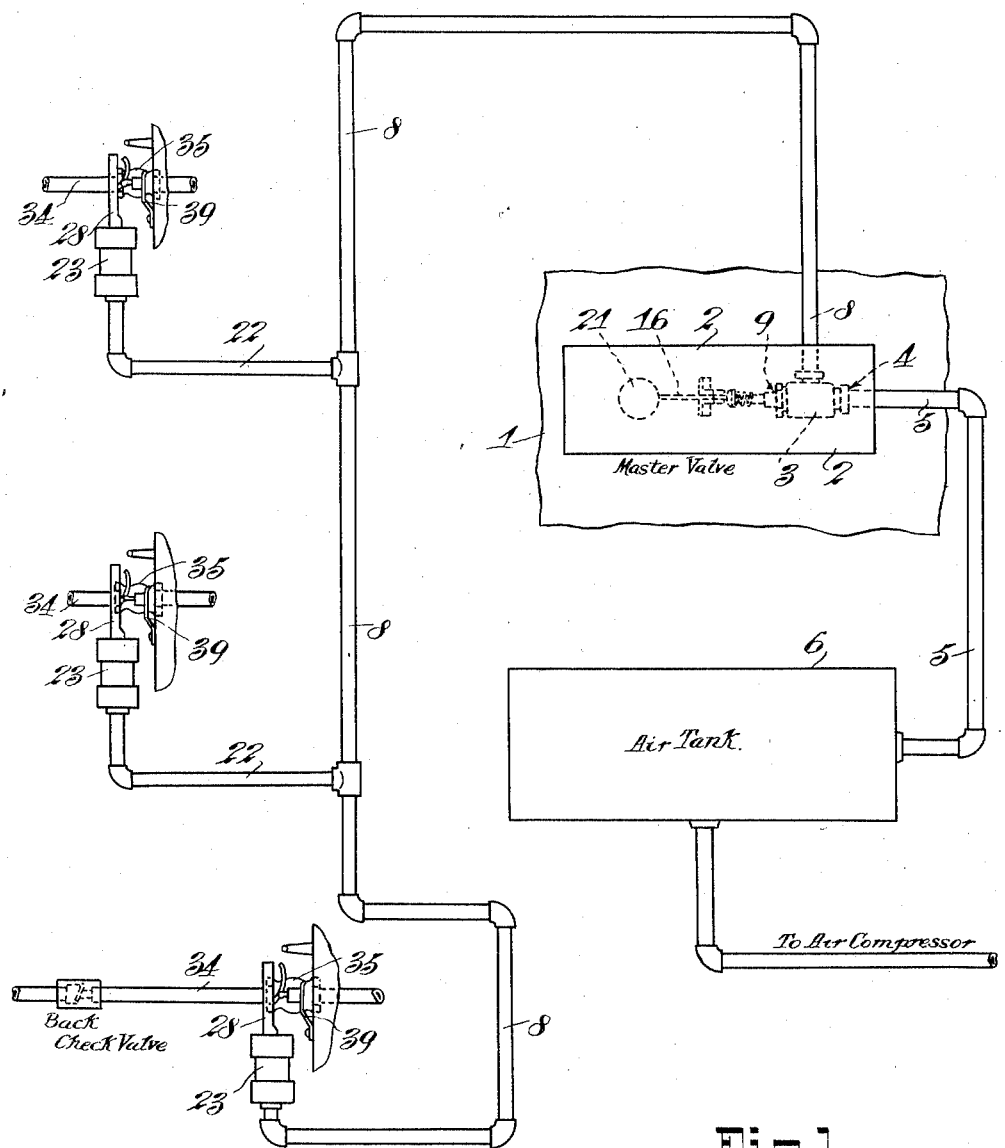

1,720,379

UNITED STATES PATENT OFFICE.

FRANK P. ROBERTSON, OF SPARKS, NEVADA.

VALVE CUT-OFF SAFETY APPARATUS.

Application filed April 21, 1927. Serial No. 185,619.

The invention primarily has for its object to provide a simple and efficiently operable apparatus preferably including an automatically actuable master valve adapted to be actuated upon collision of a locomotive with an obstruction, or the derailment and overturning thereof, to bring into action certain cut-off valves, also forming part of my improved apparatus, to cut off all steam or hot water lines leading into the locomotive cab, or lines tapped into the boiler such as water columns and the like, but which is also adaptable to use on steam ships or in industrial plants where steam or hot water lines are used to accomplish a similar valve cut-off function under manual manipulation.

More broadly expressed the invention seeks to provide safety means to guard against scalding of men occupied in the tending of steam locomotives or other systems employing steam or hot water lines whereby suitable cut-off valves controlling such pipe lines as might cause such scalding may be automatically or manually closed in case of accident.

With the above and other objects in view that will hereinafter appear, the invention further resides in the novel details of construction, combination and arrangement of parts, all of which will be first fully described, then be particularly pointed out in the appended claims, reference being had to the accompanying drawings, in which:—

Figure 1 is a diagrammatic view illustrating the application of the invention.

Figure 2 is a longitudinal section illustrating the master valve and the means for automatically actuating the same in an emergency.

Figure 3 is a cross section taken on the line 3—3 on Figure 2.

Figure 4 is a diagrammatic view illustrating a manually operable means to displace the valve holding weight.

Figure 5 is a longitudinal section illustrating a cut-off valve actuating means and its association with a cut-off valve.

Figure 6 is a view similar to Figure 5 and illustrates the parts in action effecting a cut-off adjustment of the cut-off valve.

Figure 7 is a cross section taken on the line 7—7 on Figure 5.

In the drawings 1 indicates a part of the locomotive and in the case the illustration made in Figure 2 is preferably the top of the locomotive in advance of the cab or some other suitable place convenient in view of the operation of the device as hereinafter explained. Upon the locomotive shell in the position mentioned is secured a housing 2 in any approved manner so that the same will be secure against ready displacement or breakage in case of collision or derailment and overturning of the locomotive.

It is to be understood that my invention is adaptable for use not only on locomotives but also in industrial plants or on steam ships or any other place where it is desired to utilize safety means for cutting off hot water or steam lines in an effort to prevent scalding of persons working near the pipes in case of breakage in emergencies. In this disclosure I am laying particular stress on the adaptability of the invention for use on steam locomotives to prevent scalding of the engineer in the cab thereof in case of such emergencies as are mentioned above. In the adaptation of the invention last above referred to it is to be understood that a single master valve is employed which is adapted to be brought into operation upon collision or derailment of the train to operate certain cut-out valves, through mechanism later to be described, for the purpose of closing the steam or hot water lines leading into the cab so that in case of breakage scalding of persons in the cab will not result.

In this adaptation of the invention I provide a master valve 3 and suitably mount the same in a housing 2. The valve 3 includes an air intake portion 4 which is adapted to be connected by the supply pipe line 5 with any suitable compressed air supply reservoir 6 and the said air intake portion or throatway terminates at its inner end in a valve seat 7.

The valve 3 also includes an outlet throatway which communicates with the manifold pipe line 8, the purpose for which will later appear, and with a bleed outlet 9 directly opposite the throatway 4 and which also includes a valve seat 10.

The bleed outlet or throatway 9 forms a bearing for the valve rod 11 upon which are mounted the double valves 12 alternately active on the seats 7 and 10 for a purpose later to be described. The rod 11 terminates in a spring button or head 13 which is adapted to be engaged by the short end 14 of a bell crank lever pivoted as at 15 in the housing 2 and having its long end 16 equipped with an arcuate head 17. The head 17 is operative through an aperture 18 formed in the bottom of a cup-like support 19 suitably mounted as at 20 in the said housing and which serves normally to support a weight ball 21 which depresses the head 17 and, through the bell crank lever 16, 14 and button 13, holds the double valves to the position illustrated in Figure 2 of the drawings for closing off communication from the air supply line into the master valve and for permitting any leakage that might occur around that valve to bleed out through the bearing-forming outlet 9.

It is to be understood that the air pressure in the line 5 is maintained at approximately eighty pounds per square inch so that when the ball 21 is unseated by collision of the train, either head-on or rear end, or derailment and overturning of the train, the ball will, of course, no longer act against the air pressure through the bell crank lever and the position of the double valves 12 will be reversed to permit flow of air into the master valve and therethrough into the manifold line 8 and close off the bleed throat 9. The spring button equipped head 13 serves to hold the valve steady on its seat and to prevent vibration from jarring.

In Figure 1 of the drawings I have diagrammatically illustrated the application of the invention and from this figure it will be understood that as many cut-out valves and actuators therefor are employed as may be necessary to protect all of such steam or hot water lines as may enter the locomotive cab and thus prevent scalding hazards. To thus connect a plurality of such cut-out devices, as many feeders 22 as may be necessary are connected into the manifold 8 and communicate with the intake ends of the cut-off valve actuators. Each actuator includes a cylindrical body 23 secured as at 24 to a suitable support, which may be any part of the engine housing. A piston 25 is slidable in each cylinder and is mounted on the end of a plunger or rod 26 which projects through the other end of the cylinder, a suitable cushion spring 27 being mounted in the cylinder end to absorb the shock of quick movement of the piston at the limit of its stroke.

A hollow guide sleeve projects from the end of the cylinder last mentioned and serves as a guide for the piston rod 26. The sleeve is slotted along one side as at 29 to permit lateral movement and for the lateral projection of the rod extension member 30 pivoted as at 31 to the end proper of the said piston rod. The extension member 30 is laterally bent as at 32 and equipped at its end with a recurved head 33, the purpose for which will later be apparent.

The various steam or hot water lines are indicated at 34 and 35 indicates a cut-out valve spliced into each of the said lines to cut off flow of fluid through the said lines in case of emergencies as hereinbefore referred to. The valves 35 may be of any approved type and design such as are adapted to be actuated by a quarter turn of their stem.

A squared head 36 is secured upon the stem 37 of each cut-out valve and is provided with a bore 38. As will be observed by reference to Figure 5 of the drawings a leaf spring 39 is provided and is adapted to bear against a presented flat face of the head 36 to hold the same at a particular adjusted position against inadvertent movement.

A cut-off pin 40 is pivoted as at 41 to the bent portion 32 of each extension member 30 and the said pin is off-set as indicated at 42 for the purpose presently to be described.

In operation, the parts are normally in the position illustrated in Figures 2 and 5 of the drawings. Now assume that a collision occurs, or any other emergency such as will cause an unseating of the weight ball 21. Thus released, the double valves 12 would be forced by air pressure in the supply line 5 from the position illustrated in Figure 2 of the drawings to the opposite position for opening the throat 4 and closing the bleed portion 9 and permitting flow of compressed air into the manifold line 8. The air rushing through the manifold line 8 and feeders 22 into the actuator cylinders 23 forces the several pistons 25 toward the opposite end of the cylinders causing the plungers 26 and extension members 30 to be projected.

As the members 30 are projected they will move from the position illustrated in Figure 5 of the drawings outwardly in a direction toward the left of the said figure. The pin 40 being in the slot 38 of the head 36 will cause the head and stem to be turned in the manner illustrated in Figure 6 of the drawings. This movement continues through approximately the full quarter turn necessary to close the valve. Any continued movement of the valve that is necessary may be taken care of by the spring 39. By curving the members 30 as at 32 the pin pivotal connection is brought closer to the head 36 and by providing the pivotal connection 31 of the member 30 the said member is permitted to move over toward the head in the manner illustrated in Figure 6, thereby permitting the pin to remain in the bore during the movement stated. The off-setting of the pin also facilitates the accomplishment of the movement explained.

As the parts assume the position illustrated in Figure 6 of the drawings the recurved end 33 of the member 30 comes in contact with a kick-out abutment 43 and while the pin 40 would of its own accord release itself from the bore 38 under ordinary conditions, should any tendency of the same to bind in that bore occur, it would be effectively released by the said abutment.

After the devices have accomplished the valve action desired and it is desired to reset the parts to the normal position it is only necessary to reverse the movement of the parts by forcing the members 30 and 36 rearwardly and suitably re-inserting the pin 40 in the bore 38 so as to return the parts to the position illustrated in Figure 5 of the drawings. It is understood, of course, that the ball 21 would also be replaced to close off communication between the air supply line 5 and the manifold line 8.

If desired the stem 11 of the double valves may be grooved as at 44 to facilitate the bleeding action through the throatway 9.

As indicated in Figure 1 of the drawings should any of the steam lines 34 be heating lines or the like running through the whole train, they may be equipped with suitable back check valves 45 to prevent the fluid contained therein flowing back into the cab when the emergency referred to occurs.

The idea of providing for complete disconnection of the cut-off valve actuating parts from the valve head is a desirable feature for in the case of a collision it might happen that the valve actuated to a closed position might be knocked open again by other shifting of the parts which had actuated the same and when the parts are disconnected obviously such inadvertent re-opening of the valves cannot take place.

If it is desired to adapt the invention to use in industrial plants or on steam ships where it is unlikely that the master valve could be actuated automatically in case of emergency, manual means 46 for unseating the ball 21 may be employed such as is diagrammatically illustrated in Figure 4.

From the foregoing description taken in connection with the accompanying drawings, it is thought that the novel details of construction, the manner of use and the advantages of my invention will be readily apparent to those skilled in the art to which it relates.

What I claim is:

1. In apparatus of the character described, the combination with fluid conducting pipe lines, of a cut-out valve in each line communicating with the place to be protected, a cut-out actuator associated with each cut-out valve, an air line connected with a source of compressed air, and collision operated means to effect communication between the air line and the actuator to cause it to function to actuate the cut-out valves and close off communication through said fluid conducting lines.

2. In apparatus of the character described, the combination with fluid conducting pipe lines mounted on a movable structure, of a cut-out valve in each line communicating with the place to be protected, a cut-out valve actuator associated with each cut-out valve, an air line connected with a source of compressed air, and means operable automatically in case of collision or derailment of the structure on which the apparatus is mounted to effect communication between the air line and the actuator to cause it to function to actuate the cut-out valves and close off communication through said fluid conducting lines.

3. In apparatus of the character described, the combination with fluid conducting pipe lines mounted on a movable structure, of a cut-out valve in each line communicating with the place to be protected, a cut-out valve actuator associated with each cut-out valve, an air line connected with a source of compressed air, and means operable automatically in case of collision or derailment of the structure on which the apparatus is mounted to effect communication between the air line and the actuator to cause it to function to actuate the cut-out valves and close off communication through said fluid conducting lines, said automatically operable means including a valve, a valve actuating member, a cup-like support with which said actuating member is associated, and a weight adapted normally to rest in said cup-like support in engagement with said actuating member to hold said valve closed and to be unseated in case of collision or derailment of the structure on which the apparatus is mounted to permit the valve to open for the purposes specified.

4. In apparatus of the character described, the combination with fluid conducting pipe lines, of a plurality of cut-out valves, a plurality of cut-out valve actuators one associated with each cut-out valve, an air supply line leading from a source of compressed air supply, a manifold air conduit line communicating with each actuator, a master valve communicating with the manifold line and the supply line and adapted normally to close the latter, and collision operated means to actuate the master valve to effect communication between the supply and manifold lines to the actuators to effect valve cut-off actuation thereof.

5. In apparatus of the character described, the combination with fluid conducting pipe lines mounted on a movable structure, of a plurality of cut-out valves, a plurality of cut-out valve actuators one associated with each cut-out valve, an air supply line leading from a source of compressed air supply, a manifold air conduit line communicating with each actuator, a master valve communicating with the manifold line and the supply line and adapted normally to close the latter, and means operable automatically in case of collision or derailment of the structure on which the apparatus is mounted to actuate the master valve to effect communication between the supply and manifold lines to the actuators to effect valve cut-off actuation thereof.

6. In apparatus of the character described, the combination with fluid conducting pipe lines mounted on a movable structure, of a plurality of cut-out valves, a plurality of cut-out valve actuators one associated with each cut-out valve, an air supply line leading from a source of compressed air supply, a manifold air conduit line communicating with each actuator, a master valve communicating with the manifold line and the supply line and adapted normally to close the latter, and means operable automatically in case of collision or derailment of the structure on which the apparatus is mounted to actuate the master valve to effect communication between the supply and manifold lines to the actuators to effect valve cut-off actuation thereof, said automatically operable means including a cup-like support, a valve actuating member associated with said cup-like support, and a weight adapted normally to rest in said cup-like support and in engagement with said valve actuating member to hold the master valve closed, and to be unseated in case of collision or derailment of the structure on which the apparatus is mounted to disengage the said actuating member and permit the said master valve to open for the purposes specified.

7. In apparatus of the character described, the combination with fluid conducting pipe lines, of a plurality of cut-out valves, a plurality of cut-out valve actuators one associated with each cut-out valve, an air supply line leading from a source of compressed air supply, a manifold air conduit line communicating with each actuator, a master valve communicating with the manifold line and the supply line and adapted normally to close the latter, and means to actuate the master valve to effect communication between the supply and manifold lines to the actuators to effect valve cut-off actuation thereof, and means to effect dissipation of air leakage from the air supply line into the master valve without effecting action of the actuators through the manifold line.

8. In apparatus of the character stated, the combination of an air supply line, an air conduit line, and means to connect the lines in association and to open or prevent communication therebetween as desired all mounted on a movable structure, said last named means including a valve having a supply line communicating portion, a conduit line communicating portion, and a bleed portion, a double valve member to alternately close the supply line communication and open the bleed communication or open the supply line communication and close the bleed communication, and means including a normally seated element adapted to be unseated in case of collision or derailment of the movable structure on which the apparatus is mounted to actuate the valve automatically to open communication between the lines.

9. In apparatus of the character stated, the combination of an air supply line, an air conduit line, and means to connect the lines in association and to open or prevent communication therebetween as desired, said last named means including a valve having a supply line communicating portion, a conduit line communicating portion, and a bleed portion, a double valve member to alternately close the supply line communication, and open the bleed communication or open the supply line communication and close the bleed communication, and means to actuate the valve, said actuating means comprising a cup-like support, a valve actuating arm associated with the double valve and with the support, a weight adapted normally to rest in the cup-like support in engagement with the actuating arm to hold the double valve in the communication closing position and to be unseated in case of accident to release the actuating arm and permit compressed air in the supply line to open the double valve and flow into the conduit line for the purpose specified.

10. In apparatus of the character stated, the combination of an air supply line, an air conduit line, and means to connect the lines in association and to open or prevent communication therebetween as desired, said last named means including a valve having a supply line communicating portion, a conduit line communicating portion, and a bleed portion, a double valve member to alternately close the supply line communication and open the bleed communication or open the supply line communication and close the bleed communication, and including a stem having bearing in and projecting from the bleed portion, and means to actuate the valve, said actuating means comprising a cup-like support, a valve actuating arm associated with the double valve by engagement with its projected stem and with the support, a weight adapted normally to rest in the cup-like support in engagement with the actuating arm to hold the double valve in the communication closing position and to be unseated in case of accident to release the actuating arm and permit compressed air in the supply line to open the double valve and flow into the conduit line, said projected double valve stem end having a yieldable button presented for engagement with said actuating arm for the purpose specified.

11. In apparatus of the character stated, the combination of an air supply line, an air conduit line, and means to connect the lines in association and to open or prevent communication therebetween as desired, said last named means including a valve having a supply line communicating portion, a conduit line communicating portion, and a bleed portion, a double valve member to alternately close the supply line communication and open the bleed communication or open the supply line communication and close the bleed communication, and including a stem having bearing in and projecting from the bleed portion, and means to actuate the valve, said actuating means comprising a cup-like support, a valve actuating arm associated with the double valve by engagement with its projected stem and with the support, a weight adapted normally to rest in the cup-like support in engagement with the actuating arm to hold the double valve in the communication closing position and to be unseated in case of accident to release the actuating arm and permit compressed air in the supply line to open the double valve and flow into the conduit line, said double valve stem having a longitudinal bleed groove in the portion thereof passing through the bleed portion to facilitate bleeding of air leakage for the purpose specified.

12. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, and automatically releasable pin and hole connections between said head and said member whereby when said member is shifted it will effect movement of said head and closing of said valve and release of said pin for the purpose stated.

13. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, said head having a bore therein, said member having a pin flexibly mounted thereon and detachably insertable into said [bore] whereby when said member is shifted [movement] of said head will be effected to [close the] valve and withdraw said pin for [the purpose] stated.

[14. In app]aratus of the character described, [the co]mbination with the fluid con[ducting li]ne, of a cut-out valve spliced [in said line no]rmally open to permit fluid flow through the line but closable to prevent such flow, said valve having a projected stem, a head on said stem, a longitudinally shiftable member, means to shift said member, said head having a bore therein, said member having a flexibly connected extension piece, and said extension piece having a pin flexibly mounted thereon and insertible into said bore whereby when said member is shifted movement of said head will be effected to close the valve and said extension piece will be permitted to move out of alignment with said member for the purpose specified.

15. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, said head having a bore therein, said member having an extension piece pivoted thereto and being curved adjacent its end toward the said head and a pin pivoted to the curved portion of the extension piece and insertible into the said bore whereby when said member is shifted movement of said head will be effected to close the valve and said pin will be permitted to remain in said bore during substantially the whole of the closing movement and then become disengaged from said bore.

16. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, said head having a bore therein, said member having an extension piece pivoted thereto and being curved adjacent its end toward the said head and a pin pivoted to the curved portion of the extension piece and insertable into the said bore whereby when said member is shifted movement of said head will be effected to close the valve and said pin will be permitted to remain in said bore during substantially the whole of the closing movement and then become disengaged from said bore, said head having flat faces, and a leaf spring to engage a presented flat face of said head for the purposes specified.

17. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, and pin and hole connections between said head and said member whereby when said member is shifted it will effect movement of said head and closing of said valve, said head having flat faces, and a leaf spring to engage a presented flat face of said head for the purposes specified.

18. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, and pin and hole connections between said head and said member whereby when said member is shifted it will effect movement of said head to close said valve and disconnect said pin, said shifting means comprising a cylinder, a piston in the cylinder, and means to admit air into the cylinder behind the piston to shift the same, said shiftable member being projected into the cylinder and connected to move with the piston.

19. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, and pin and hole connections between said head and said member whereby when said member is shifted it will effect movement of said head to close said valve and disconnect said pin, said shifting means comprising a cylinder, a piston in the cylinder, means to admit air into the cylinder behind the piston to shift the same, said shiftable member being projected into the cylinder and connected to move with the piston, and a tubular guide for said shiftable member extending from an end of said cylinder and having a lateral grooveway therein to permit movement of the pin and slot connections.

20. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, said head having a bore therein, said member having an extension piece pivoted thereto and being curved adjacent its end toward the said head and recurved at its extreme end away from said head, a pin pivoted to the curved portion of the extension piece and insertable into the said bore whereby when said member is shifted movement of said head will be effected to close the valve and said pin will be permitted to remain in said bore during substantially the whole of the closing movement and then become disengaged from said bore, and an abutment adapted to be engaged by said recurved end to insure disengagement of said pin from said bore.

21. In apparatus of the character described, the combination with the fluid conducting pipe line, of a cut-out valve spliced in said line normally open to permit fluid flow through the line but closable to prevent such flow, said valve having a projected stem, a head on said stem, a longitudinally shiftable member, means to shift said member, said head having a bore therein, said member having an extension piece pivoted thereto and being curved adjacent its end toward the said head, a pin pivoted to the curved portion of the extension piece and insertable into the said bore whereby when said member is shifted movement of said head will be effected to close the valve and said pin will be permitted to remain in said bore during substantially the whole of the closing movement and then become disengaged from said bore, said member shifting means comprising a cylinder, a piston in the cylinder, and means to admit air into the cylinder behind the piston to shift the same, said shiftable member being projected into the cylinder and connected to move with the piston, and a tubular guide for said shiftable member extending from an end of said cylinder and having a lateral grooveway therein to permit movement of the pivoted extension piece and the pivoted pin outwardly toward said head for the purposes specified.

22. In apparatus of the character described, the combination with the fluid conducting pipe line mounted on a movable structure, of a cut-out valve spliced in said line normally open to permit fluid flow through the line but closable to prevent such flow, said valve having a projected stem, a head on said stem, a longitudinally shiftable member, means to shift said member, said head having a bore therein, said member having an extension piece pivoted thereto and being curved adjacent its end toward the said head, a pin pivoted to the curved portion of the extension piece and insertable into the said bore whereby when said member is shifted movement of said head will be effected to close the valve and said pin will be permitted to remain in said bore during substantially the whole of the closing movement and then become disengaged from said bore, said member shifting means comprising a cylinder, a piston in the cylinder, and means automatically operative upon collision or derailment of the structure which the apparatus is mounted air into the cylinder behind th shift the same, said shiftable m projected into the cylinder a to move with the piston, a tubular guide for said shiftable member extending from an end of said cylinder and having a lateral grooveway therein to permit movement of the pivoted extension piece and the pivoted pin outwardly toward said head, said automatically operable air admitting means comprising a master valve, an air supply line leading to the valve, an air conduit line connecting the valve to the cylinder behind the piston, a valve actuating member, a cup-like support with which said actuating member is associated, and a weight adapted normally to rest in said cup-like support in engagement with said actuating member to hold said valve closed and to be unseated in case of collision or derailment of the structure on which the apparatus is mounted to permit the valve to open for the purposes specified.

23. In apparatus of the character described, the combination with the fluid conducting pipe line mounted on a movable structure, of a cut-out valve spliced in said line normally open to permit fluid to flow through the line but closable to prevent such flow, said valve having a projected stem, a head on said stem, a longitudinally shiftable member, means to shift said member, said head having a bore therein, said member having an extension piece pivoted thereto and being curved adjacent its end toward the said head, a pin pivoted to the curved portion of the extension piece and insertable into the said bore whereby when said member is shifted movement of said head will be effected to close the valve and said pin will be permitted to remain in said bore during substantially the whole of the closing movement and then become disengaged from said bore, said member shifting means comprising a cylinder, a piston in the cylinder, means automatically operative upon collision or derailment of the structure on which the apparatus is mounted to admit air into the cylinder behind the piston to shift the same, said shiftable member being projected into the cylinder and connected to move with the piston, a tubular guide for said shiftable member extending from an end of said cylinder and having a grooveway therein to permit movement of the pivoted extension piece and the pivoted pin outwardly toward said head, said automatically operable air admitting means comprising a master valve having a supply line communicating portion, a conduit line communicating portion and a bleed portion, an air supply line leading to the master valve, an air conduit leading from the master valve to the cylinder, a double valve member to alternately close the supply line and open the bleed communication or open the supply line and conduit line communication and close the bleed communication, and means to actuate the double valve automatically in case of collision or derailment of the structure on which the apparatus is mounted comprising a valve actuating member, a cup-like support with which said actuating member is associated and a weight adapted normally to rest in said cup-like support in engagement with said actuating member to hold said valve closed and to be unseated in case of collision or derailment of the structure on which the apparatus is mounted to permit the valve to open for the purposes specified.

FRANK P. ROBERTSON.